J. M. RICE.
SIGNAL DEVICE FOR MOTOR VEHICLES.
APPLICATION FILED DEC. 12, 1918.

1,340,292.

Patented May 18, 1920.

Inventor
JOSEPH M. RICE
By E. E. Sauzé
Attorney.

UNITED STATES PATENT OFFICE.

JOSEPH M. RICE, OF MISSOULA, MONTANA.

SIGNAL DEVICE FOR MOTOR-VEHICLES.

1,340,292.   Specification of Letters Patent.   Patented May 18, 1920.

Application filed December 12, 1918. Serial No. 266,415.

*To all whom it may concern:*

Be it known that I, JOSEPH M. RICE, a citizen of the United States, residing at Missoula, in the county of Missoula and State of Montana, have invented certain new and useful Improvements in Signal Devices for Motor-Vehicles, of which the following is a specification.

This invention relates to a signal device for motor vehicles and is designed to be easily applied to the upholstered arm of a motor vehicle seat in such a position as not to interfere with the arrangement of the side curtains, and to be easily accessible for operation. This invention is also designed to be operable by the forearm of the driver without disturbing the position of the driver's hands upon the controlling mechanism of the car.

The object of the invention is to provide a signaling device that is readily operable from the inside of the car, that may be easily attached to any car, and which will operate as a signal to vehicles and pedestrians.

With this and other objects in view, reference is had to the accompanying drawings, in which—

Figure 1:
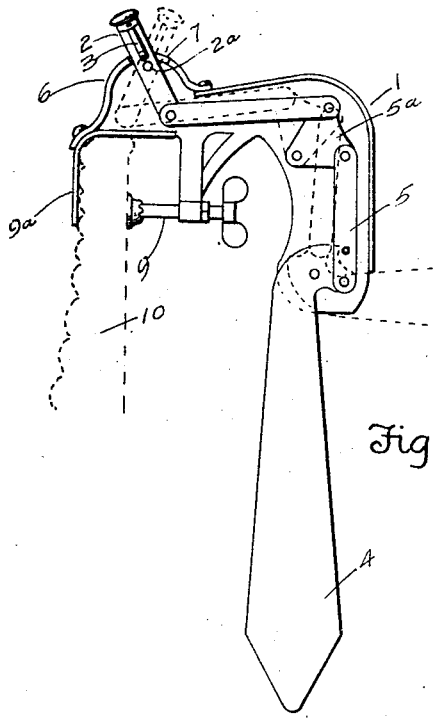
Figure 1 is a side elevation with one side removed.
Figure 2:
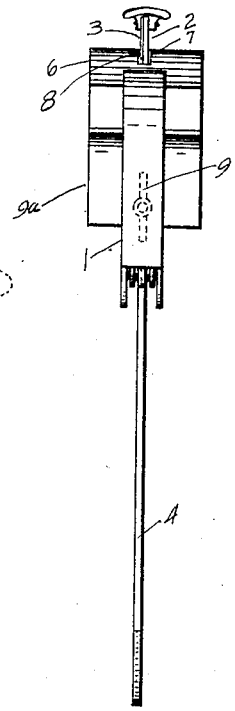
Fig. 2 is a rear elevation.
Figure 3:
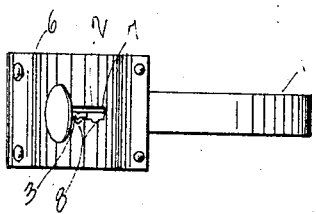
Fig. 3 is a plan view.

In the drawing 1 represents the housing which contains the moving parts consisting of the control lever 2, a spring clip 3, a signal arm 4, connecting links 5, bell crank 5ª, guard plate 6 in which is a slot 7 in which are notches 8, and a clamping means 9. Fig. 1 shows the device clamped to a fragment of a motor vehicle 10.

The housing 1 is preferably made of sheet metal, stamped to shape, and assembled in any suitable manner. The housing is curved so that it projects outward and downward about the clamp, thus protecting the clamp from accidental loosening.

The control lever 2 is pivoted at 2ª to the housing and is operated by a lateral thrust either from the forearm or elbow, and is in such a position with respect to the curtains that they cannot interfere with its operation.

The spring clip 3, attached to the control lever, engages notches in the guard plate to be hereinafter explained, and holds the control lever in its signaling position with such tension that a light touch on the control lever restores the signal arm to its pendent position.

The signal arm 4 is pivotally mounted in the housing 1, depending therefrom in its normal or inoperative position, and is arranged to swing in a vertical plane to a horizontal position, the horizontal position being the signaling or operative position.

Between the signal arm 4 and the control lever 2, and connecting the two pivotally, are connecting links 5 and a bell crank 5ª. The bell crank 5ª is pivoted to the housing 1, as is the control lever 2 and the signal arm 4, and the connecting links are pivoted in turn to the control lever, bell crank and signal arm, thus forming a connecting means within the housing and pivotally connecting the control lever and the signal arm. As connecting links and bell cranks are old in the art and as other means may be adopted that will perform the same function, a detailed description of the connecting links is deemed unnecessary.

Above the housing, at the inner end thereof, and attached thereto, is a guard plate 6. This guard plate is curved to protect the control lever and extends downward, joining with the jaw of the clamping means. Besides protecting the control lever it is made broad to protect the sleeve of the driver against injury.

A slot 7 is cut in the top of the guard plate to receive the control lever, and in this slot is cut notches 8, preferably two in number, to register with the above described spring clip 3.

A clamping means is provided, consisting of the usual thumbscrew 9 and the broad jaw 9ª, which rests against the uphostering of the arm of the seat, while the thumbscrew is screwed against the side of the car, thus attaching the device rigidly to the car. That the thumbscrew 9 may be protected from accidental loosening, the housing is extended over the thumbscrew, thus protecting the clamping means.

In use the device is clamped to the seat arm or side of the vehicle near the driver of the car, with the control lever pointing inward and the signal arm pendant. Now, should another car be approaching from the rear or from in front, and the driver of the car carrying the signal device desires to change direction, with his hands still on the wheel he presses his elbow or forearm against the control lever, and with a lateral thrust forces it outward, raising the signal arm to a horizontal position in full view of approaching cars or pedestrians.

By this means accidents may be avoided both by other drivers colliding with the car on a turn, or by losing control of the car by the driver removing one hand for use as a signal.

While I have described in detail the construction, location and use of this signal device, I wish it understood that modifications may be resorted to within the scope of the invention and without departing from the spirit thereof.

Having thus described my invention, I claim—

1. In a signal device for motor vehicles, a curved housing, a laterally operating control lever pivotally mounted in the housing, a signal arm pivotally and operably mounted in the housing and normally depending therefrom, connecting links contained within the housing and pivotally connecting the control lever and the signal arm, a guard plate attached to the housing and slotted to accommodate the control lever, and a clamping means guarded by the housing.

2. In a signal device for motor vehicles, a curved housing, a laterally operating control lever pivotally mounted in the housing, a spring clip attached to the control lever, a signal arm pivotally mounted in the housing and normally depending therefrom, said arm being arranged to operate in a vertical plane to a horizontal position, connecting means contained within the housing and pivotally connecting the control lever and the signal arm, a guard plate attached to the housing and slotted to accommodate the control lever, said slot having notches to register with the above mentioned spring clip, and a clamping means attached to and guarded by the curved housing.

In testimony whereof I have affixed my signature.

JOSEPH M. RICE.